S. R. GARR.
PROCESS AND APPARATUS FOR CONVERTING MATTE.
APPLICATION FILED OCT. 21, 1915.
1,209,282.
Patented Dec. 19, 1916.
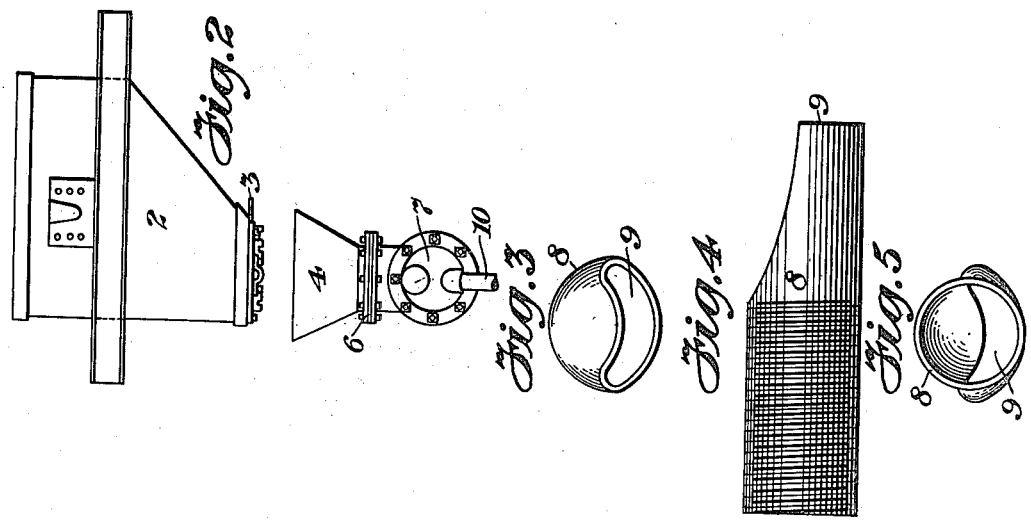
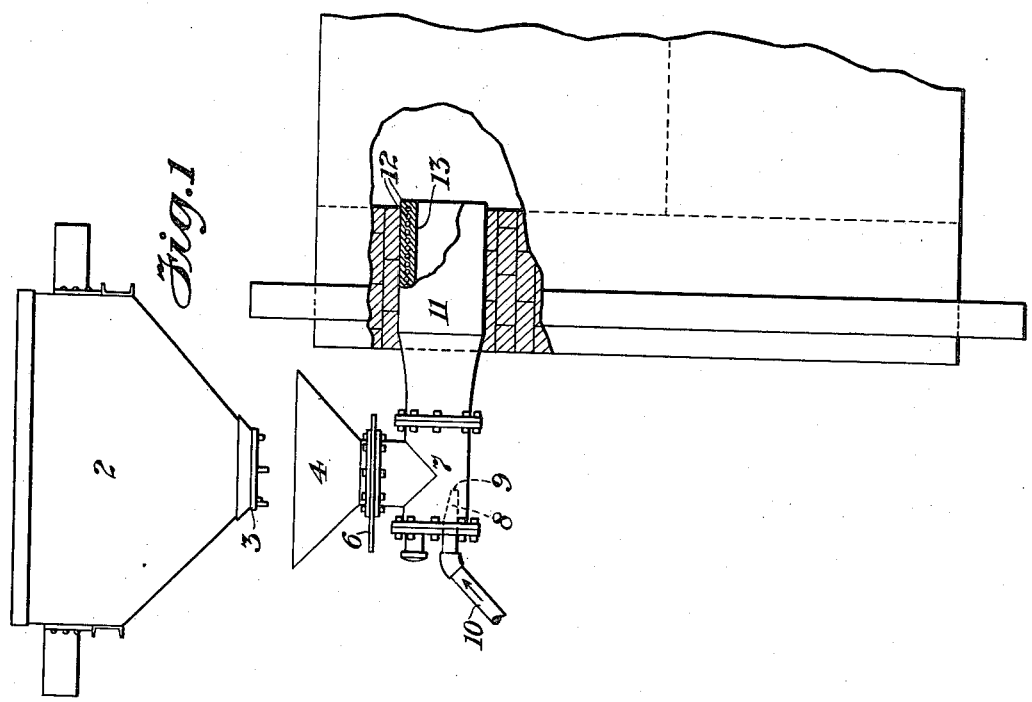
WITNESS
Chas. F. Clagett
INVENTOR
Samuel Richard Garr
BY Messimer and Austin.
HIS ATTORNEY

UNITED STATES PATENT OFFICE.

SAMUEL RICHARD GARR, OF GARFIELD, UTAH, ASSIGNOR TO AMERICAN SMELTING & REFINING CO., A CORPORATION OF NEW JERSEY.

PROCESS AND APPARATUS FOR CONVERTING MATTE.

1,209,282.   Specification of Letters Patent.   Patented Dec. 19, 1916.

Application filed October 21, 1915. Serial No. 57,030.

*To all whom it may concern:*

Be it known that I, SAMUEL RICHARD GARR, a citizen of the United States, and resident of Garfield, in the county of Salt Lake and State of Utah, have invented certain new and useful Improvements in Processes and Apparatus for Converting Matte, of which the following is a specification.

This invention relates broadly to improvements in treating ores, and relates particularly to the process of converting copper matte into copper metal.

Heretofore it has been customary to add converter silica by means of a crane or ladle, which empties the silica into the converter as a single mass or charge. This results in delays and other disadvantages, and occasionally causes dangerous explosions.

One of the objects of this invention is to supply the silica in such a manner that it will be more uniformly disseminated and quickly utilized throughout the molten materials while the converter is operating, and increase the blowing time of the converter.

A further object of the invention is to supply the silica in such a manner that the losses from spilling and the inconvenience caused by dust will be eliminated, and the danger from explosions that result from putting a large quantity of silica into the converter at one point will be avoided.

Still a further object of the invention is to provide for the use of the silica either in a moistened or in a dry condition, and at such times as to prevent interference with other operations of the converter.

Various other objects will be in part obvious from an inspection of the drawings, and in part will be more fully set forth in the following particular description of the various steps embodying my process and of one form of mechanism for practising the same.

In the accompanying drawings: Figure 1 is a side elevation of a converter, indicated diagrammatically, which is provided with my improved apparatus, the inlet being shown broken away to disclose the construction more clearly; Fig. 2 is an end view of the feed apparatus; Figs. 3, 4 and 5 are detail views, showing the nozzle of the air inlet.

In practising my improved invention, the converter may be of any preferred construction, such, for example, as the rotary converter 1 indicated diagrammatically in the drawings.

The silica is supplied to the converter preferably in the form of a powder, which is disseminated in the converter space above the level of the bath. Preferably the silica is introduced into the converter under considerable pressure, so that it will be forced into all parts of the converter space, and disseminated more or less evenly and uniformly therein. The total quantity of silica supplied may vary according to the class of material being treated and the condition of the converter. Preferably it is supplied intermittently, as the converter process is carried on. It is not necessary to dry the silica as heretofore, and preferably it is supplied in a relatively moist condition.

As shown in the accompanying drawings, silica is supplied from a reservoir 2, through a gate 3, into a hopper 4. Said hopper communicates through a gate 6 with a drum 7, having an air nozzle 8 therein. The gate 6 is primarily designed to prevent the back passage of flames and gases from the converter during the time when the ejector is not in use. Said nozzle has a flattened or kidney shaped outlet 9, and is secured by any suitable means to a pipe 10 communicating with a suitable air compressor (not shown).

The drum is detachably secured in any suitable manner to a barrel 11, mounted in the end wall of the converter. Said barrel comprises a water cooled wall which may be formed by embedding a water coil 12 in the casting. Preferably a lining 13 is provided for the barrel, comprising a sleeve of chilled cast iron, which may be of one piece or made in sections, as desired.

In operation, the silica is supplied from the reservoir to the hopper, and thence through the gate into the drum, where it is subjected to the air blast entering through the nozzle. The pressure is sufficient to carry the silica throughout all the converter space above the level of the matte. The intake is located near the top of the converter, and the air nozzle is so constructed and arranged that the air will be forced into a plane approximately parallel to the level of the matte and an appreciable distance above the same, whereby the silica is caused to settle in an approximately uniform amount over all of the surface. By means of this construction a much better distribution of the silica is obtained than is possible when the silica is supplied from a ladle in the usual manner.

The silica is delivered onto the charge while the converter is in operation without making practically any dust, thus allowing the converter to be turned with the stack pointing into the hood. Since the silica comes into contact with the charge in relatively small and uniform quantities, all losses by spilling are eliminated, and the danger to the workmen incurred while putting silica into the converter in the usual manner is entirely avoided.

The capacity of a converter employing my improved process and apparatus is largely increased, as it is operating practically all of the time, and there is no loss of time while waiting for crane service to furnish silica, or similar causes, as the silica can be furnished independently of the crane whenever convenient, and the incidental losses to the machinery about the converter, due to the large quantities of silica dust caused by the methods heretofore employed, are entirely overcome.

I claim as my invention:

1. A process of smelting ores and matte which consists in disseminating fluent silica in a closed space above the material while the same is being treated and allowing said silica to settle in substantially uniform quantities over the surface.

2. In the art of smelting, the process which consists in disseminating silica over the charge during the process of converting.

3. The process of treating ores and matte which consists in forcing fluent silica containing some moisture above the surface of a converter charge and allowing the same to settle on the charge.

4. In the art of treating ores, the process which consists in blowing silica into a converter containing a bath of ore and into the space therein above the level of the bath.

5. The combination with a converter, of a barrel extending through a wall thereof, means for supplying material to the barrel, means associated with the barrel for cooling the material therein, and means for forcing the material from the barrel into the converter.

6. The combination with a converter provided with an inlet, means for forcing air under pressure through said inlet, a hopper communicating with the inlet to supply material thereto and means for controlling the supply of material from the hopper to said inlet and for preventing the back passage of gases from the converter.

7. The combination with a converter, of an inlet arranged above the normal level of the converter contents, a nozzle having a kidney shaped discharge opening for forcing a current of air under pressure through said inlet and means for supplying fluent silica in the path of said air current.

8. The combination with a converter, of a barrel extending through and projecting beyond the wall of the converter, a receiving drum communicating with the barrel and constituting an extension thereof, means for supplying fluent material to the drum and means positioned in the portion of the drum remote from the end opening into the barrel for forcing said material from the drum through the barrel and into the converter under pressure.

9. The combination with a converter provided with an inlet, a barrel fitted in said inlet and opening into the converter above the normal level of the converter contents, a drum having a closed rear end and an open front end communicating with the barrel, a hopper opening into the top of the drum and provided with a closing gate for shutting off the conveyer from the outside through the hopper, and an air nozzle opening into the drum adjacent the bottom thereof and below the opening from the hopper.

10. The combination with a converter provided with an inlet, a barrel fitted in said inlet and opening into the converter above the normal level of the converter contents, a drum having a closed rear end and an open front end communicating with the barrel, a hopper opening into the top of the drum and provided with a closing gate for shutting off the conveyer from the outside through the hopper, an air nozzle opening into the drum adjacent the bottom thereof and below the opening from the hopper, said nozzle provided with a flat opening designed to direct the air in a broad substantially shallow stream along the bottom of the barrel.

Signed at Garfield in the county of Salt Lake and State of Utah this 5th day of October A. D. 1915.

SAMUEL RICHARD GARR.

Witness:
O. W. KUMROW.